H. B. SMITH.
Wheel Cultivator.

No. 55,381. Patented June 5, 1866.

UNITED STATES PATENT OFFICE.

H. B. SMITH, OF EUREKA, ILLINOIS.

IMPROVEMENT IN CULTIVATORS.

Specification forming part of Letters Patent No. 55,381, dated June 5, 1866.

*To all whom it may concern:*

Be it known that I, H. B. SMITH, of Eureka, in the county of Woodford and State of Illinois, have invented a new and Improved Cultivator; and I do hereby declare that the following is a full, clear, and exact description thereof, which will enable those skilled in the art to make and use the same, reference being had to the accompanying drawings, forming part of this specification, in which—

Figure 1:
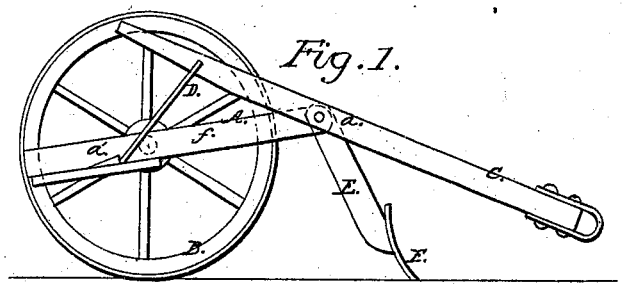
Figure 2:
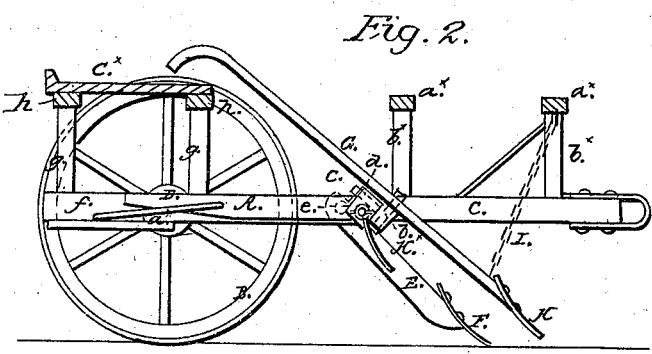
Figure 3:
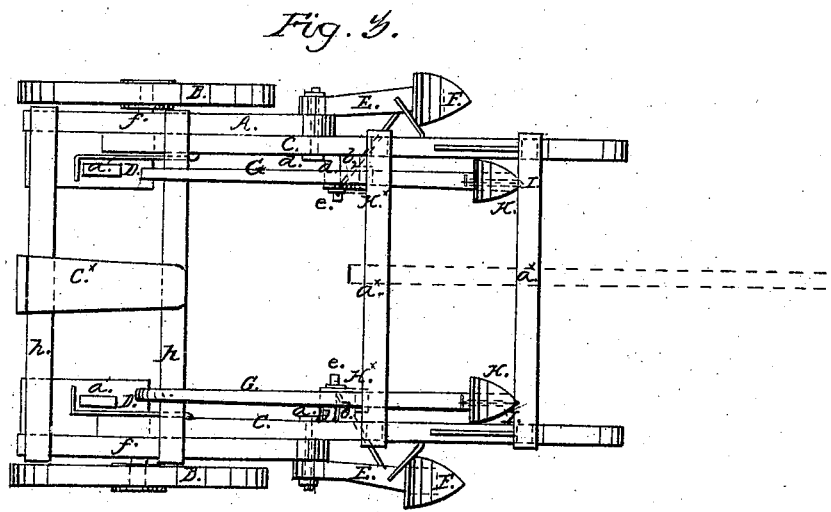

Figure 1 is a side view of my invention with the inner plow-beams detached; Fig. 2, a side sectional view of the same complete, taken in the line $x\,x$, Fig. 3; Fig. 3, a plan or top view of the same.

Similar letters of reference indicate corresponding parts.

This invention relates to a new and improved cultivator of that class which are designed for plowing crops grown in hills or drills; and it consists in a novel and improved construction and arrangement of the several parts, as hereinafter fully shown and described, whereby the driver or operator has full control over the plows, and several advantages obtained, which will be hereinafter set forth.

A represents the main frame of the machine, which is mounted on two wheels, B B, and has the driver's seat $C^\times$ upon it, and C C are two beams which are attached to the frame A, one at each side, and work on pivot-bolts $a\,a$. These beams may be secured in an inclined position by means of props D D secured to the rear parts of the beams and having their lower ends bearing against stops or projections $a'\,a'$ on the frame A. The object of this adjustment will be presently shown.

To the front end of the main frame A, at each side, there is attached a standard, E, having a plow, F, secured to its lower end. These plows F are in line with the wheels B B, so that the latter may run in the furrows made by said plows.

G G are two plow-beams, the lower ends of which have plows H attached to them. These plow-beams extend upward, so as to be within convenient reach of the driver on seat $C^\times$, and the upper ends of said beams are curved and rounded to serve as handles, as shown clearly in Fig. 2.

The plow-beams G are connected to the beams C C one to each, by means of universal joints $H^\times$, composed of arms $b$, which project at right angles from the under sides of the beams G G, and have pins $c$ attached parallel with the beams and passing loosely through arms $d$, which are fitted loosely on pivots $e$ projecting at right angles from the inner sides of the beams C C. The beams G G are allowed to work freely on the arms $b$, so that the plows H may be moved laterally, and the pins $c$ of the arms $b$ are allowed to turn freely in the arms $d$, which admits of a lateral rolling motion being given the plows, while the up-and-down or vertical motion of the plows are allowed in consequence of the arms $d$ turning on the pivots $e$. Thus it will be seen that by this simple arrangement the driver will have complete control over the plows H, so that he can raise or lower them to clear obstructions, move them or roll them laterally, so that they may conform to the sinuosities of the rows of plants, or raise them entirely out of the ground when required.

The plows F are raised out of the ground by tilting upward the rear ends of the beams C C, and this adjustment is facilitated by the weight of the driver on his seat $C^\times$. The braces or props D D secure the frame A and beams C C in this position, as shown clearly in Fig. 1.

A horse is attached to each beam C C, and these beams are allowed an independent forward and backward movement, caused by the frame A being so constructed that its side bars, $f\,f$, may be moved or adjusted nearer together or farther apart, as may be desired. These side bars, $f\,f$, have no rigid cross-bars. They have standards $g\,g$, which are provided at their lower ends with round tenons and connected at their upper ends by cross-bars $h\,h$, on which the driver's seat $C^\times$ is placed. The arms of the wheels B B are attached to the side pieces, $f\,f$, and hence it will be seen that the frame A may be expanded or contracted laterally, and each part or side of the frame allowed to yield or give independently of the other in case the plows at either side come in contact with obstructions. The draft also is rendered uniform by this arrangement, each animal being allowed to do his share of the work and no more, and the plows will not be subjected to any greater degree of resistance or have any more work put upon them than the power of one horse can control, as each horse draws two plows.

The plow-beams G G are supported by chains

I, attached to cross-bars $a^x$ on the upper ends of uprights $b^x$, attached to the beams C C, said uprights having round tenons at their lower ends which are fitted in the beams C C. This is necessary in order to admit of said beams being adjusted nearer together or farther apart, in accordance with the side beams, $ff$, of the frame A.

The draft-pole shown in red is attached to the front cross-bar, $a^x$, by a pivot-bolt which admits of a lateral movement, so that the tongue may at the ends of the rows turn with the team and admit of the plows reaching nearer to the ends of the rows than it otherwise would.

Having thus described my invention, I claim as new and desire to secure by Letters Patent—

1. The constructing of the frame A in the manner substantially as herein shown and described, to admit of said frame being expanded and contracted laterally to adjust the plows nearer together or farther apart, as may be required, and admit of a direct application of the draft of each animal to the device, as set forth.

2. In combination with the frame A thus constructed, the pivoted beams C C, arranged or applied substantially as and for the purpose set forth.

3. The connecting of the plow-beams G G to the beams C C by means of the universal joints $H^x$, constructed substantially as shown and described, to admit of the vertical, lateral, and rolling motion of the plows, as set forth.

4. The combination of the adjustable frame A, pivoted beams C C, plow-beams G G, all arranged to operate in the manner substantially as and for the purpose set forth.

H. B. SMITH.

Witnesses:
  SAMUEL SPEAR,
  A. S. MARSILLIOT.